(12) United States Patent
Lynam

(10) Patent No.: US 9,140,789 B2
(45) Date of Patent: *Sep. 22, 2015

(54) FORWARD FACING SENSING SYSTEM FOR VEHICLE

(71) Applicant: MAGNA ELECTRONICS INC., Auburn Hills, MI (US)

(72) Inventor: Niall R. Lynam, Holland, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/107,624

(22) Filed: Dec. 16, 2013

(65) Prior Publication Data

US 2014/0104095 A1    Apr. 17, 2014

Related U.S. Application Data

(60) Division of application No. 13/656,975, filed on Oct. 22, 2012, now Pat. No. 8,614,640, which is a continuation of application No. 13/540,856, filed on Jul. 3, 2012, now Pat. No. 8,294,608, which is a (Continued)

(51) Int. Cl.
*G01S 13/86* (2006.01)
*G01S 13/93* (2006.01)
(Continued)

(52) U.S. Cl.
CPC ................ *G01S 13/931* (2013.01); *B60T 7/22* (2013.01); *G01S 13/86* (2013.01); *G01S 13/867* (2013.01);
(Continued)

(58) Field of Classification Search
CPC .................. G01S 13/86–13/867; G01S 13/91; G01S 13/93; G01S 13/931; G08G 1/16–1/168

USPC .................. 342/52–55, 70–72; 701/117–119; 340/936, 937

See application file for complete search history.

(56) References Cited

U.S. PATENT DOCUMENTS 2,632,040 A    3/1953 Rabinow
2,827,594 A    3/1958 Rabinow
(Continued)

FOREIGN PATENT DOCUMENTS

EP    1506893    2/2005

OTHER PUBLICATIONS

European Search Report for European Patent Application No. 08780377.1 dated Jun. 7, 2010.
(Continued)

*Primary Examiner* — Peter Bythrow
(74) *Attorney, Agent, or Firm* — Gardner, Linn, Burkhart & Flory, LLP

(57) ABSTRACT

A vehicular forward facing sensing system includes a radar sensor device disposed within an interior cabin of a vehicle and having a sensing direction forward of the vehicle. An image sensor is disposed within the interior cabin of the vehicle and has a viewing direction forward of the vehicle. A control includes an image processor, which is operable to analyze images captured by the image sensor in order to, at least in part, detect an object present forward of the vehicle. The control, at least in part, determines that a potentially hazardous condition may exist in the path of forward travel of the vehicle. The radar sensor device and image sensor collaborate in a way that enhances the sensing capability of the sensing system for the potentially hazardous condition in the path of forward travel of the vehicle. The image processor processes captured image data utilizing object detection software.

11 Claims, 2 Drawing Sheets

Related U.S. Application Data continuation of application No. 13/192,525, filed on Jul. 28, 2011, now Pat. No. 8,217,830, which is a continuation of application No. 12/524,446, filed as application No. PCT/US2008/051833 on Jan. 24, 2008, now Pat. No. 8,013,780.

(60) Provisional application No. 60/886,568, filed on Jan. 25, 2007.

(51) Int. Cl.
 *B60T 7/22* (2006.01)
 *G01S 17/02* (2006.01)

(52) U.S. Cl.
 CPC ............... *G01S 13/93* (2013.01); *G01S 17/023* (2013.01); *G01S 2013/9321* (2013.01); *G01S 2013/9357* (2013.01); *G01S 2013/9392* (2013.01)

(56) References Cited

U.S. PATENT DOCUMENTS

| | | | |
|---|---|---|---|
| 3,349,394 A | 10/1967 | Carver | |
| 3,601,614 A | 8/1971 | Platzer | |
| 3,612,666 A | 10/1971 | Rabinow | |
| 3,665,224 A | 5/1972 | Kelsey | |
| 3,680,951 A | 8/1972 | Jordan | |
| 3,689,695 A | 9/1972 | Rosenfield et al. | |
| 3,708,231 A | 1/1973 | Walters | |
| 3,746,430 A | 7/1973 | Brean | |
| 3,807,832 A | 4/1974 | Castellion | |
| 3,811,046 A | 5/1974 | Levick | |
| 3,813,540 A | 5/1974 | Albrecht | |
| 3,862,798 A | 1/1975 | Hopkins | |
| 3,947,095 A | 3/1976 | Moultrie | |
| 3,962,600 A | 6/1976 | Pittman | |
| 3,985,424 A | 10/1976 | Steinacher | |
| 3,986,022 A | 10/1976 | Hyatt | |
| 4,037,134 A | 7/1977 | Löper | |
| 4,052,712 A | 10/1977 | Ohama et al. | |
| 4,093,364 A | 6/1978 | Miller | |
| 4,111,720 A | 9/1978 | Michel et al. | |
| 4,161,653 A | 7/1979 | Bedini | |
| 4,200,361 A | 4/1980 | Malvano | |
| 4,214,266 A | 7/1980 | Myers | |
| 4,218,698 A | 8/1980 | Bart et al. | |
| 4,236,099 A | 11/1980 | Rosenblum | |
| 4,247,870 A | 1/1981 | Gabel et al. | |
| 4,249,160 A | 2/1981 | Chilvers | |
| 4,266,856 A | 5/1981 | Wainwright | |
| 4,277,804 A | 7/1981 | Robison | |
| 4,281,898 A | 8/1981 | Ochiai | |
| 4,288,814 A | 9/1981 | Talley et al. | |
| 4,355,271 A | 10/1982 | Noack | |
| 4,357,558 A | 11/1982 | Massoni et al. | |
| 4,381,888 A | 5/1983 | Momiyama | |
| 4,420,238 A | 12/1983 | Felix | |
| 4,431,896 A | 2/1984 | Lodetti | |
| 4,443,057 A | 4/1984 | Bauer | |
| 4,460,831 A | 7/1984 | Oettinger et al. | |
| 4,481,450 A | 11/1984 | Watanabe et al. | |
| 4,491,390 A | 1/1985 | Tong-Shen | |
| 4,512,637 A | 4/1985 | Ballmer | |
| 4,529,275 A | 7/1985 | Ballmer | |
| 4,529,873 A | 7/1985 | Ballmer | |
| 4,546,551 A | 10/1985 | Franks | |
| 4,549,208 A | 10/1985 | Kamejima et al. | |
| 4,571,082 A | 2/1986 | Downs | |
| 4,572,619 A | 2/1986 | Reininger | |
| 4,580,875 A | 4/1986 | Bechtel | |
| 4,600,913 A | 7/1986 | Caine | |
| 4,603,946 A | 8/1986 | Kato | |
| 4,614,415 A | 9/1986 | Hyatt | |
| 4,620,141 A | 10/1986 | McCumber et al. | |
| 4,623,222 A | 11/1986 | Itoh | |
| 4,626,850 A | 12/1986 | Chey | |
| 4,629,941 A | 12/1986 | Ellis | |
| 4,630,109 A | 12/1986 | Barton | |
| 4,632,509 A | 12/1986 | Ohmi | |
| 4,638,287 A | 1/1987 | Umebayashi et al. | |
| 4,647,161 A | 3/1987 | Müuller | |
| 4,669,825 A | 6/1987 | Itoh | |
| 4,669,826 A | 6/1987 | Itoh | |
| 4,671,615 A | 6/1987 | Fukada | |
| 4,672,457 A | 6/1987 | Hyatt | |
| 4,676,601 A | 6/1987 | Itoh | |
| 4,690,508 A | 9/1987 | Jacob | |
| 4,692,798 A | 9/1987 | Seko et al. | |
| 4,697,883 A | 10/1987 | Suzuki | |
| 4,701,022 A | 10/1987 | Jacob | |
| 4,713,685 A | 12/1987 | Nishimura et al. | |
| 4,717,830 A | 1/1988 | Botts | |
| 4,727,290 A | 2/1988 | Smith | |
| 4,731,669 A | 3/1988 | Hayashi et al. | |
| 4,741,603 A | 5/1988 | Miyagi | |
| 4,768,135 A | 8/1988 | Kretschmer et al. | |
| 4,789,904 A | 12/1988 | Peterson | |
| 4,793,690 A | 12/1988 | Gahan | |
| 4,817,948 A | 4/1989 | Simonelli | |
| 4,820,933 A | 4/1989 | Hong | |
| 4,825,232 A | 4/1989 | Howdle | |
| 4,838,650 A | 6/1989 | Stewart | |
| 4,847,772 A | 7/1989 | Michalopoulos et al. | |
| 4,862,037 A | 8/1989 | Farber et al. | |
| 4,867,561 A | 9/1989 | Fujii et al. | |
| 4,871,917 A | 10/1989 | O'Farrell et al. | |
| 4,872,051 A | 10/1989 | Dye | |
| 4,881,019 A | 11/1989 | Shiraishi et al. | |
| 4,882,565 A | 11/1989 | Gallmeyer | |
| 4,886,960 A | 12/1989 | Molyneux | |
| 4,891,559 A | 1/1990 | Matsumoto et al. | |
| 4,892,345 A | 1/1990 | Rachael, III | |
| 4,895,790 A | 1/1990 | Swanson et al. | |
| 4,896,030 A | 1/1990 | Miyaji | |
| 4,907,870 A | 3/1990 | Brucker | |
| 4,910,591 A | 3/1990 | Petrossian et al. | |
| 4,916,374 A | 4/1990 | Schierbeek | |
| 4,917,477 A | 4/1990 | Bechtel et al. | |
| 4,937,796 A | 6/1990 | Tendler | |
| 4,943,796 A * | 7/1990 | Lee | 340/435 |
| 4,953,305 A | 9/1990 | Van Lente et al. | |
| 4,956,591 A | 9/1990 | Schierbeek | |
| 4,961,625 A | 10/1990 | Wood et al. | |
| 4,967,319 A | 10/1990 | Seko | |
| 4,970,653 A | 11/1990 | Kenue | |
| 4,971,430 A | 11/1990 | Lynas | |
| 4,974,078 A | 11/1990 | Tsai | |
| 4,987,357 A | 1/1991 | Masaki | |
| 4,991,054 A | 2/1991 | Walters | |
| 5,001,558 A | 3/1991 | Burley et al. | |
| 5,003,288 A | 3/1991 | Wilhelm | |
| 5,012,082 A | 4/1991 | Watanabe | |
| 5,016,977 A | 5/1991 | Baude et al. | |
| 5,027,001 A | 6/1991 | Torbert | |
| 5,027,200 A | 6/1991 | Petrossian et al. | |
| 5,044,706 A | 9/1991 | Chen | |
| 5,055,668 A | 10/1991 | French | |
| 5,059,877 A | 10/1991 | Teder | |
| 5,064,274 A | 11/1991 | Alten | |
| 5,072,154 A | 12/1991 | Chen | |
| 5,086,253 A | 2/1992 | Lawler | |
| 5,096,287 A | 3/1992 | Kakinami et al. | |
| 5,097,362 A | 3/1992 | Lynas | |
| 5,121,200 A | 6/1992 | Choi | |
| 5,124,549 A | 6/1992 | Michaels et al. | |
| 5,130,709 A | 7/1992 | Toyama et al. | |
| 5,148,014 A | 9/1992 | Lynam | |
| 5,168,378 A | 12/1992 | Black | |
| 5,170,374 A | 12/1992 | Shimohigashi et al. | |
| 5,172,235 A | 12/1992 | Wilm et al. | |
| 5,177,685 A | 1/1993 | Davis et al. | |
| 5,182,502 A | 1/1993 | Slotkowski et al. | |
| 5,184,956 A | 2/1993 | Langlais et al. | |

(56) References Cited

U.S. PATENT DOCUMENTS

| | | |
|---|---|---|
| 5,189,561 A | 2/1993 | Hong |
| 5,193,000 A | 3/1993 | Lipton et al. |
| 5,193,029 A | 3/1993 | Schofield et al. |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,309,163 A | 5/1994 | Ngan et al. |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,381,155 A * | 1/1995 | Gerber ......................... 342/104 |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,042 A * | 5/1996 | Nelson ......................... 340/937 |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A * | 8/1996 | Schofield et al. ............. 359/604 |
| 5,568,027 A | 10/1996 | Teder |
| 5,574,443 A | 11/1996 | Hsieh |
| 5,581,464 A | 12/1996 | Woll et al. |
| 5,585,798 A * | 12/1996 | Yoshioka et al. ............... 342/70 |
| 5,594,222 A | 1/1997 | Caldwell |
| 5,614,788 A | 3/1997 | Mullins et al. |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,657,021 A * | 8/1997 | Ehsani-Nategh et al. ....... 342/70 |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A * | 9/1997 | Schofield et al. ............. 340/461 |
| 5,677,851 A | 10/1997 | Kingdon et al. |
| 5,699,044 A | 12/1997 | Van Lente et al. |
| 5,715,093 A | 2/1998 | Schierbeek et al. |
| 5,724,187 A | 3/1998 | Varaprasad et al. |
| 5,724,316 A | 3/1998 | Brunts |
| 5,737,226 A | 4/1998 | Olson et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A * | 8/1998 | Nakayama ...................... 701/28 |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,847,676 A * | 12/1998 | Cole ............................ 342/104 |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,872,536 A * | 2/1999 | Lyons et al. ..................... 342/70 |
| 5,877,707 A | 3/1999 | Kowalick |
| 5,877,897 A * | 3/1999 | Schofield et al. ............. 359/604 |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A * | 7/1999 | Stam et al. ................. 250/208.1 |
| 5,929,786 A | 7/1999 | Schofield et al. |
| 5,933,109 A * | 8/1999 | Tohya et al. .................. 342/175 |
| 5,938,717 A * | 8/1999 | Dunne et al. ................. 701/117 |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,959,571 A * | 9/1999 | Aoyagi et al. ................... 342/70 |
| 5,963,247 A | 10/1999 | Banitt |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,020,704 A | 2/2000 | Buschur |
| 6,049,171 A | 4/2000 | Stam et al. |
| 6,057,754 A * | 5/2000 | Kinoshita et al. ............. 340/435 |
| 6,066,933 A | 5/2000 | Ponziana |
| 6,067,110 A * | 5/2000 | Nonaka et al. ................ 348/148 |
| 6,075,492 A | 6/2000 | Schmidt et al. |
| 6,084,519 A | 7/2000 | Coulling et al. |
| 6,085,151 A * | 7/2000 | Farmer et al. ................. 701/301 |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,118,401 A * | 9/2000 | Tognazzini ..................... 342/29 |
| 6,118,410 A * | 9/2000 | Nagy ............................ 343/713 |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |

(56) References Cited

U.S. PATENT DOCUMENTS

| | | | |
|---|---|---|---|
| 6,172,613 B1 | 1/2001 | DeLine et al. | |
| 6,175,164 B1 | 1/2001 | O'Farrell et al. | |
| 6,175,300 B1 | 1/2001 | Kendrick | |
| 6,198,409 B1 | 3/2001 | Schofield et al. | |
| 6,201,642 B1* | 3/2001 | Bos | 359/565 |
| 6,216,540 B1 | 4/2001 | Nelson et al. | |
| 6,222,447 B1 | 4/2001 | Schofield et al. | |
| 6,222,460 B1 | 4/2001 | DeLine et al. | |
| 6,243,003 B1 | 6/2001 | DeLine et al. | |
| 6,250,148 B1* | 6/2001 | Lynam | 73/170.17 |
| 6,259,412 B1 | 7/2001 | Duroux | |
| 6,266,082 B1 | 7/2001 | Yonezawa et al. | |
| 6,266,442 B1 | 7/2001 | Laumeyer et al. | |
| 6,278,399 B1* | 8/2001 | Ashihara | 342/173 |
| 6,285,393 B1 | 9/2001 | Shimoura et al. | |
| 6,291,906 B1 | 9/2001 | Marcus et al. | |
| 6,294,989 B1 | 9/2001 | Schofield et al. | |
| 6,297,781 B1 | 10/2001 | Turnbull et al. | |
| 6,302,545 B1 | 10/2001 | Schofield et al. | |
| 6,310,611 B1 | 10/2001 | Caldwell | |
| 6,313,454 B1* | 11/2001 | Bos et al. | 250/208.1 |
| 6,317,057 B1 | 11/2001 | Lee | |
| 6,320,176 B1 | 11/2001 | Schofield et al. | |
| 6,320,282 B1 | 11/2001 | Caldwell | |
| 6,323,477 B1 | 11/2001 | Blasing et al. | |
| 6,326,613 B1 | 12/2001 | Heslin et al. | |
| 6,329,925 B1 | 12/2001 | Skiver et al. | |
| 6,333,759 B1 | 12/2001 | Mazzilli | |
| 6,341,523 B2* | 1/2002 | Lynam | 73/170.17 |
| 6,353,392 B1* | 3/2002 | Schofield et al. | 340/602 |
| 6,366,213 B2 | 4/2002 | DeLine et al. | |
| 6,370,329 B1 | 4/2002 | Teuchert | |
| 6,396,397 B1* | 5/2002 | Bos et al. | 340/461 |
| 6,411,204 B1 | 6/2002 | Bloomfield et al. | |
| 6,411,328 B1 | 6/2002 | Franke et al. | |
| 6,420,975 B1 | 7/2002 | DeLine et al. | |
| 6,424,273 B1 | 7/2002 | Gutta et al. | |
| 6,428,172 B1 | 8/2002 | Hutzel et al. | |
| 6,430,303 B1 | 8/2002 | Naoi et al. | |
| 6,433,676 B2 | 8/2002 | DeLine et al. | |
| 6,442,465 B2 | 8/2002 | Breed et al. | |
| 6,452,148 B1 | 9/2002 | Bendicks et al. | |
| 6,462,700 B1 | 10/2002 | Schmidt et al. | |
| 6,477,464 B2 | 11/2002 | McCarthy et al. | |
| 6,485,155 B1 | 11/2002 | Duroux et al. | |
| 6,492,935 B1* | 12/2002 | Higuchi | 342/70 |
| 6,497,503 B1 | 12/2002 | Dassanayake et al. | |
| 6,498,620 B2* | 12/2002 | Schofield et al. | 348/148 |
| 6,513,252 B1 | 2/2003 | Schierbeek et al. | |
| 6,516,664 B2* | 2/2003 | Lynam | 73/170.17 |
| 6,523,964 B2 | 2/2003 | Schofield et al. | |
| 6,534,884 B2 | 3/2003 | Marcus et al. | |
| 6,539,306 B2 | 3/2003 | Turnbull | |
| 6,547,133 B1 | 4/2003 | DeVries, Jr. et al. | |
| 6,553,130 B1 | 4/2003 | Lemelson et al. | |
| 6,555,804 B1 | 4/2003 | Blasing | |
| 6,559,435 B2 | 5/2003 | Schofield et al. | |
| 6,574,033 B1 | 6/2003 | Chui et al. | |
| 6,580,385 B1* | 6/2003 | Winner et al. | 342/70 |
| 6,589,625 B1 | 7/2003 | Kothari et al. | |
| 6,593,565 B2 | 7/2003 | Heslin et al. | |
| 6,594,583 B2 | 7/2003 | Ogura et al. | |
| 6,611,202 B2 | 8/2003 | Schofield et al. | |
| 6,611,610 B1 | 8/2003 | Stam et al. | |
| 6,627,918 B2 | 9/2003 | Getz et al. | |
| 6,636,148 B2* | 10/2003 | Higuchi | 340/436 |
| 6,636,258 B2 | 10/2003 | Strumolo | |
| 6,648,477 B2 | 11/2003 | Hutzel et al. | |
| 6,650,233 B2 | 11/2003 | DeLine et al. | |
| 6,650,455 B2 | 11/2003 | Miles | |
| 6,672,731 B2 | 1/2004 | Schnell et al. | |
| 6,674,562 B1 | 1/2004 | Miles | |
| 6,678,614 B2 | 1/2004 | McCarthy et al. | |
| 6,680,792 B2 | 1/2004 | Miles | |
| 6,690,268 B2* | 2/2004 | Schofield et al. | 340/438 |
| 6,696,978 B2* | 2/2004 | Trajkovic et al. | 340/936 |
| 6,700,605 B1 | 3/2004 | Toyoda et al. | |
| 6,703,925 B2 | 3/2004 | Steffel | |
| 6,704,621 B1 | 3/2004 | Stein et al. | |
| 6,710,908 B2 | 3/2004 | Miles et al. | |
| 6,711,474 B1 | 3/2004 | Treyz et al. | |
| 6,714,331 B2 | 3/2004 | Lewis et al. | |
| 6,717,610 B1 | 4/2004 | Bos et al. | |
| 6,727,807 B2 | 4/2004 | Trajkovic et al. | |
| 6,735,506 B2 | 5/2004 | Breed et al. | |
| 6,741,377 B2 | 5/2004 | Miles | |
| 6,744,353 B2 | 6/2004 | Sjönell | |
| 6,757,109 B2 | 6/2004 | Bos | |
| 6,762,867 B2 | 7/2004 | Lippert et al. | |
| 6,771,208 B2* | 8/2004 | Lutter et al. | 342/52 |
| 6,772,057 B2 | 8/2004 | Breed et al. | |
| 6,794,119 B2 | 9/2004 | Miles | |
| 6,795,014 B2* | 9/2004 | Cheong | 342/118 |
| 6,795,221 B1 | 9/2004 | Urey | |
| 6,802,617 B2 | 10/2004 | Schofield et al. | |
| 6,806,452 B2* | 10/2004 | Bos et al. | 250/208.1 |
| 6,812,882 B2* | 11/2004 | Ono | 342/70 |
| 6,816,084 B2* | 11/2004 | Stein | 340/903 |
| 6,818,884 B2 | 11/2004 | Koch et al. | |
| 6,822,563 B2 | 11/2004 | Bos et al. | |
| 6,823,241 B2 | 11/2004 | Shirato et al. | |
| 6,823,244 B2 | 11/2004 | Breed | |
| 6,824,281 B2* | 11/2004 | Schofield et al. | 359/876 |
| 6,828,903 B2* | 12/2004 | Watanabe et al. | 340/435 |
| 6,831,261 B2 | 12/2004 | Schofield et al. | |
| 6,831,591 B2* | 12/2004 | Horibe | 342/52 |
| 6,838,980 B2* | 1/2005 | Gloger et al. | 340/435 |
| 6,841,767 B2 | 1/2005 | Mindl et al. | |
| 6,847,487 B2 | 1/2005 | Burgner | |
| 6,856,873 B2 | 2/2005 | Breed et al. | |
| 6,859,705 B2* | 2/2005 | Rao et al. | 701/45 |
| 6,864,784 B1* | 3/2005 | Loeb | 340/441 |
| 6,873,912 B2* | 3/2005 | Shimomura | 701/301 |
| 6,879,281 B2 | 4/2005 | Gresham et al. | |
| 6,882,287 B2 | 4/2005 | Schofield | |
| 6,889,161 B2 | 5/2005 | Winner et al. | |
| 6,891,563 B2 | 5/2005 | Schofield et al. | |
| 6,903,677 B2* | 6/2005 | Takashima et al. | 342/70 |
| 6,909,753 B2 | 6/2005 | Meehan et al. | |
| 6,941,211 B1* | 9/2005 | Kuroda et al. | 701/70 |
| 6,944,544 B1 | 9/2005 | Prakah-Asante et al. | |
| 6,946,978 B2* | 9/2005 | Schofield | 340/995.28 |
| 6,947,577 B2 | 9/2005 | Stam et al. | |
| 6,953,253 B2 | 10/2005 | Schofield et al. | |
| 6,958,729 B1 | 10/2005 | Metz | |
| 6,968,736 B2* | 11/2005 | Lynam | 73/170.17 |
| 6,975,390 B2 | 12/2005 | Mindl et al. | |
| 6,975,775 B2 | 12/2005 | Rykowski et al. | |
| 6,987,419 B2 | 1/2006 | Gresham | |
| 6,999,024 B2 | 2/2006 | Kumon et al. | |
| 7,004,593 B2 | 2/2006 | Weller et al. | |
| 7,004,606 B2 | 2/2006 | Schofield | |
| 7,005,974 B2 | 2/2006 | McMahon et al. | |
| 7,012,560 B2* | 3/2006 | Braeuchle et al. | 342/70 |
| 7,038,577 B2 | 5/2006 | Pawlicki et al. | |
| 7,042,389 B2* | 5/2006 | Shirai | 342/70 |
| 7,062,300 B1 | 6/2006 | Kim | |
| 7,065,432 B2 | 6/2006 | Moisel et al. | |
| 7,085,637 B2 | 8/2006 | Breed et al. | |
| 7,092,548 B2 | 8/2006 | Laumeyer et al. | |
| 7,116,246 B2 | 10/2006 | Winter et al. | |
| 7,123,168 B2 | 10/2006 | Schofield | |
| 7,126,460 B2* | 10/2006 | Yamada | 340/435 |
| 7,126,525 B2* | 10/2006 | Suzuki et al. | 342/70 |
| 7,149,613 B2 | 12/2006 | Stam et al. | |
| 7,167,796 B2 | 1/2007 | Taylor et al. | |
| 7,176,830 B2* | 2/2007 | Horibe | 342/70 |
| 7,188,963 B2* | 3/2007 | Schofield et al. | 359/844 |
| 7,196,305 B2 | 3/2007 | Shaffer et al. | |
| 7,199,747 B2 | 4/2007 | Jenkins et al. | |
| 7,202,776 B2 | 4/2007 | Breed | |
| 7,227,459 B2 | 6/2007 | Bos et al. | |
| 7,227,611 B2 | 6/2007 | Hull et al. | |
| 7,311,406 B2 | 12/2007 | Schofield et al. | |

(56) References Cited

U.S. PATENT DOCUMENTS

| | | |
|---|---|---|
| 7,322,755 B2 | 1/2008 | Neumann et al. |
| 7,325,934 B2 | 2/2008 | Schofield et al. |
| 7,325,935 B2 | 2/2008 | Schofield et al. |
| 7,339,149 B1 | 3/2008 | Schofield et al. |
| 7,344,261 B2 | 3/2008 | Schofield et al. |
| 7,380,948 B2 | 6/2008 | Schofield et al. |
| 7,388,182 B2 | 6/2008 | Schofield et al. |
| 7,400,266 B2* | 7/2008 | Haug .................... 340/903 |
| 7,402,786 B2 | 7/2008 | Schofield et al. |
| 7,423,248 B2 | 9/2008 | Schofield et al. |
| 7,425,076 B2 | 9/2008 | Schofield et al. |
| 7,432,848 B2* | 10/2008 | Munakata ................ 342/52 |
| 7,436,038 B2 | 10/2008 | Engelmann et al. |
| 7,439,507 B2 | 10/2008 | Deasy et al. |
| 7,453,374 B2* | 11/2008 | Koike et al. ............ 340/903 |
| 7,459,664 B2 | 12/2008 | Schofield et al. |
| 7,460,951 B2* | 12/2008 | Altan et al. ............. 701/536 |
| 7,480,149 B2* | 1/2009 | DeWard et al. ......... 361/728 |
| 7,526,103 B2* | 4/2009 | Schofield et al. ....... 382/104 |
| 7,542,835 B2* | 6/2009 | Takahama et al. ........ 701/45 |
| 7,558,007 B2 | 7/2009 | Katoh et al. |
| 7,561,181 B2 | 7/2009 | Schofield et al. |
| 7,570,198 B2 | 8/2009 | Tokoro |
| 7,587,072 B2 | 9/2009 | Russo et al. |
| 7,613,568 B2* | 11/2009 | Kawasaki ................ 701/301 |
| 7,616,781 B2 | 11/2009 | Schofield et al. |
| 7,619,508 B2 | 11/2009 | Lynam et al. |
| 7,619,562 B2 | 11/2009 | Stumbo et al. |
| 7,633,383 B2* | 12/2009 | Dunsmoir et al. ....... 340/435 |
| 7,639,149 B2 | 12/2009 | Katoh |
| 7,671,806 B2 | 3/2010 | Voigtlaender |
| 7,706,978 B2* | 4/2010 | Schiffmann et al. .... 701/301 |
| 7,720,580 B2 | 5/2010 | Higgins-Luthman |
| 7,728,272 B2 | 6/2010 | Blaesing |
| 7,765,065 B2* | 7/2010 | Stiller .................... 701/301 |
| 7,777,669 B2 | 8/2010 | Tokoro et al. |
| 7,811,011 B2 | 10/2010 | Blaesing et al. |
| 7,828,478 B2 | 11/2010 | Rege et al. |
| 7,855,353 B2 | 12/2010 | Blaesing et al. |
| 7,881,496 B2* | 2/2011 | Camilleri et al. ....... 382/104 |
| 7,914,187 B2 | 3/2011 | Higgins-Luthman et al. |
| 7,920,251 B2* | 4/2011 | Chung ................... 356/28 |
| 7,978,122 B2 | 7/2011 | Schmidlin |
| 8,013,780 B2* | 9/2011 | Lynam ..................... 342/70 |
| 8,192,095 B2 | 6/2012 | Kortan et al. |
| 8,217,830 B2* | 7/2012 | Lynam ..................... 342/70 |
| 8,294,608 B1* | 10/2012 | Lynam ..................... 342/70 |
| 8,614,640 B2* | 12/2013 | Lynam ..................... 342/52 |
| 2002/0015153 A1 | 2/2002 | Downs |
| 2002/0021229 A1* | 2/2002 | Stein ........................ 340/933 |
| 2002/0044065 A1 | 4/2002 | Quist et al. |
| 2002/0113873 A1 | 8/2002 | Williams |
| 2002/0159270 A1 | 10/2002 | Lynam et al. |
| 2003/0080878 A1* | 5/2003 | Kirmuss ................... 340/936 |
| 2003/0112132 A1* | 6/2003 | Trajkovic et al. ........ 340/435 |
| 2003/0137586 A1 | 7/2003 | Lewellen |
| 2003/0138132 A1* | 7/2003 | Stam et al. ............... 382/104 |
| 2003/0201929 A1* | 10/2003 | Lutter et al. ............. 342/52 |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0114381 A1 | 6/2004 | Salmeen et al. |
| 2004/0128065 A1 | 7/2004 | Taylor et al. |
| 2004/0200948 A1 | 10/2004 | Bos et al. |
| 2004/0227663 A1* | 11/2004 | Suzuki et al. ............ 342/70 |
| 2004/0246167 A1* | 12/2004 | Kumon et al. ........... 342/70 |
| 2005/0046978 A1* | 3/2005 | Schofield et al. ....... 359/876 |
| 2005/0078389 A1 | 4/2005 | Kulas et al. |
| 2005/0102070 A1* | 5/2005 | Takahama et al. ........ 701/1 |
| 2005/0104089 A1* | 5/2005 | Engelmann et al. ..... 257/204 |
| 2005/0134966 A1 | 6/2005 | Burgner |
| 2005/0134983 A1 | 6/2005 | Lynam |
| 2005/0146792 A1 | 7/2005 | Schofield et al. |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2005/0232469 A1 | 10/2005 | Schofield et al. |
| 2005/0264891 A1 | 12/2005 | Uken et al. |
| 2005/0270225 A1* | 12/2005 | Tokoro ..................... 342/70 |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0067378 A1* | 3/2006 | Rege et al. .............. 374/120 |
| 2006/0091654 A1* | 5/2006 | De Mersseman et al. .... 280/735 |
| 2006/0091813 A1 | 5/2006 | Stam et al. |
| 2006/0103727 A1 | 5/2006 | Tseng |
| 2006/0157639 A1* | 7/2006 | Shaffer et al. ........... 250/208.1 |
| 2006/0164230 A1 | 7/2006 | DeWind et al. |
| 2006/0250501 A1 | 11/2006 | Wildmann et al. |
| 2007/0023613 A1 | 2/2007 | Schofield et al. |
| 2007/0088488 A1* | 4/2007 | Reeves et al. ........... 701/117 |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0152152 A1* | 7/2007 | Deasy et al. ............. 250/338.1 |
| 2007/0176080 A1 | 8/2007 | Schofield et al. |
| 2008/0117097 A1 | 5/2008 | Walter et al. |
| 2008/0180529 A1 | 7/2008 | Taylor et al. |
| 2009/0113509 A1 | 4/2009 | Tseng et al. |
| 2010/0001897 A1* | 1/2010 | Lyman ..................... 342/70 |
| 2010/0045797 A1 | 2/2010 | Schofield et al. |
| 2011/0037640 A1* | 2/2011 | Schmidlin ................ 342/55 |

OTHER PUBLICATIONS

Bombini et al. "Radar-vision fusion for vehicle detection" Dipartimento di Ingegneria dell'Informazione Universit_a di Parma Parma I-43100 Italy Mar. 14, 2006.

PCT International Search Report of PCT/US2008/051833 dated Oct. 7, 2008.

European Examination Report for EP Application No. 08780377.1 dated Aug. 8, 2012.

\* cited by examiner

FORWARD FACING SENSING SYSTEM FOR VEHICLE

CROSS REFERENCE TO RELATED APPLICATIONS

This application is a divisional of U.S. patent application Ser. No. 13/656,975, filed Oct. 22, 2012, now U.S. Pat. No. 8,614,640, which is a continuation of U.S. patent application Ser. No. 13/540,856, filed Jul. 3, 2012, now U.S. Pat. No. 8,294,608, which is a continuation of U.S. patent application Ser. No. 13/192,525, filed Jul. 28, 2011, now U.S. Pat. No. 8,217,830, which is a continuation of U.S. patent application Ser. No. 12/524,446, filed Jul. 24, 2009, now U.S. Pat. No. 8,013,780, which is a 371 application of PCT Application No. PCT/US2008/051833, filed Jan. 24, 2008, which claims the benefit of U.S. Provisional Patent Application No. 60/886,568, filed Jan. 25, 2007, which are incorporated herein by reference for all purposes.

FIELD OF THE INVENTION

The present invention generally relates to forward facing sensing systems and, more particularly, to forward facing sensing systems utilizing a radar sensor device.

BACKGROUND OF THE INVENTION

It is known to provide a radar (radio detection and ranging) system (such as a 77 GHz radar or other suitable frequency radar) on a vehicle for sensing the area forward of a vehicle, such as for an adaptive cruise control (ACC) system or an ACC stop and go system or the like. It is also known to provide a lidar (laser imaging detection and ranging) system for sensing the area forward of a vehicle for similar applications. Typically, the radar system is preferred for such vehicle applications because of its ability to detect better than the lidar system in fog or other inclement weather conditions.

Typically, such radar sensor devices are often located at the front grille of the vehicle and thus may be intrusive to the underhood packaging of the vehicle and the exterior styling of the vehicle. Although it is known to provide a lidar sensing device or system at the windshield for scanning/detecting through the windshield, radar systems are typically not suitable for such applications, since they typically are not suitable for viewing through glass, such as through the vehicle windshield (because the glass windshield may substantially attenuate the radar performance or ability to detect objects forward of the vehicle). It is also known to augment such a radar or lidar system with a forward facing camera or image sensor.

SUMMARY OF THE INVENTION

The present invention provides a forward facing sensing system for detecting objects forward of the vehicle (such as for use with or in conjunction with an adaptive cruise control system or other object detection system or the like), with a radar sensor device being located behind, and transmitting through [typically, transmitting at at least about 20 GHz frequency (such as 24 GHz) and more preferably at least about 60 GHz frequency (such as 60 GHz or 77 GHz or 79 GHz or thereabouts)], a radar transmitting portion established at the upper windshield area of the vehicle. The radar sensor device is positioned at a recess or pocket or opening formed at and along the upper edge of the windshield so as to have a forward transmitting and receiving direction for radar electromagnetic waves that is not through the glass panels of the windshield. The vehicle or sensing system preferably includes a sealing or cover element, such as a plastic cover element at the sensing device to seal/environmentally protect the radar sensor device within the cabin of the vehicle while allowing for transmission of and receipt of radar frequency electromagnetic radiation waves to and from the exterior of the vehicle.

According to an aspect of the present invention, a forward facing sensing system or radar sensing system for a vehicle includes a radar sensor device disposed at a pocket or recess or opening established at an upper edge of the vehicle windshield and having a forward transmitting and receiving direction that is not through the windshield. A cover panel is disposed at the radar sensor device and is substantially sealed at the vehicle windshield at or near the pocket at the upper edge of the vehicle windshield. The cover panel comprises a material that is substantially transmissive to radar frequency electromagnetic radiation waves. The radar sensor device transmits and receives radar frequency electromagnetic radiation waves that transmit through the cover panel. The system includes a control that is responsive to an output of the radar sensor device.

According to another aspect of the present invention, a forward facing sensing system for a vehicle includes a radar sensor device operable to detect an object ahead of the vehicle, a forward facing image sensor having a forward field of view, and a control responsive to an output of the radar sensor device and responsive to an output of the forward facing image sensor. The control is operable to control sensing by the radar sensor device and the control is operable to control a focused or enhanced interrogation of a detected object (or area at which a detected object is detected) in response to a detection of an object forward of the vehicle by the radar sensor device. The control may be operable to at least one of (a) control enhanced interrogation of a detected object by the radar sensor device in response to the forward facing image sensor detecting an object (such as by enhancing the interrogation via a beam aiming or beam selection technique, such as by digital beam forming in a phased array antenna system or such as by digital beam steering or the like), and (b) control enhanced interrogation of a detected object by the forward facing image sensor in response to the radar sensor device detecting an object (such as by enhancing the interrogation via enhanced or intensified algorithmic processing of a portion of the image plane of the image sensor that is spatially related to the location of the detected object in the forward field of view of the image sensor). The control thus may be responsive to the forward facing image sensor to guide or control the focused interrogation of the detected object by the radar sensor device, or the control may be responsive to the radar sensor device to guide or control the focused or enhanced interrogation of the detected object by the forward facing image sensor (such as via directing or controlling the image sensor and/or its field of view or zoom function or via image processing of the captured image data, such as by providing enhanced processing of the area at which the object is detected).

Optionally, and desirably, the forward facing image sensor and the radar sensor device may be commonly established on a semiconductor substrate. Optionally, the semiconductor substrate may comprise one of (i) a germanium substrate, (ii) a gallium arsenide substrate, and (iii) a silicon germanium substrate.

These and other objects, advantages, purposes and features of the present invention will become apparent upon review of the following specification in conjunction with the drawings.

DESCRIPTION OF THE PREFERRED EMBODIMENTS

Figure 1:
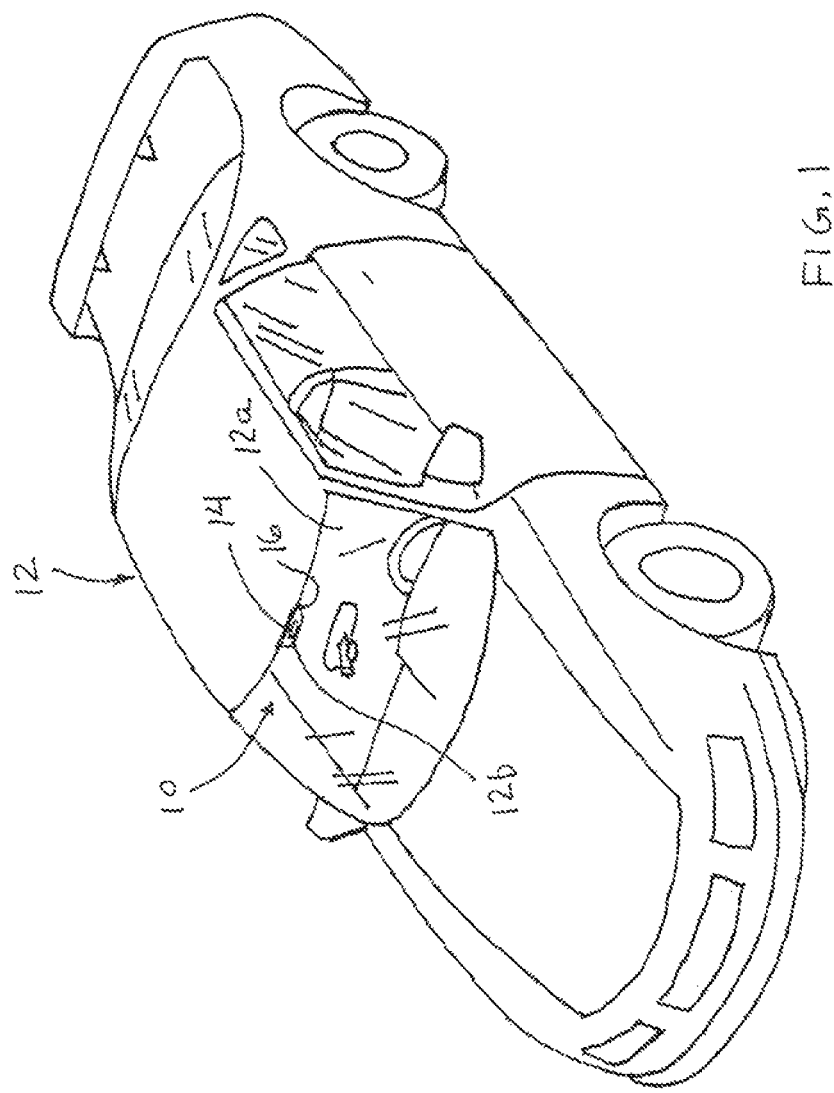
FIG. 1 is a perspective view of a vehicle incorporating a forward facing radar sensing system in accordance with the present invention.
Figure 2:
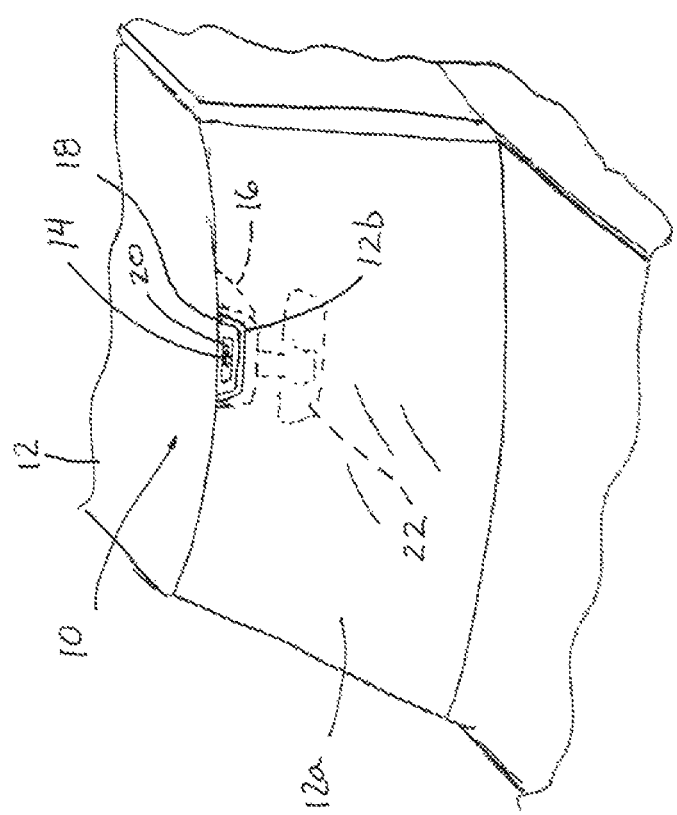
FIG. 2 is a perspective view of a windshield and radar sensing system of the present invention.

Referring now to the drawings and the illustrative embodiments depicted therein, a sensing system or forward facing sensing system or radar sensing system 10 for a vehicle 12 includes a radar sensor device 14 at an upper region of the vehicle windshield 12a and with a forward transmitting and sensing direction forward of the vehicle and in the forward direction of travel of the vehicle (FIG. 1). The windshield glass 12a may be formed with a cutout or pocket 12b at the upper edge. The pocket may be cut from the glass (so as to provide a cut opening at the upper edge of the glass windshield) or the glass may be formed with an inward bulge or pocket that provides an opening for the sensing device. The radar sensor device 14 thus may be disposed at the pocket 12b and may have a clear or unobstructed view or sensing direction forward of the vehicle that does not pass through glass (and whereby the glass windshield will not attenuate the performance of the radar sensor device). Because the upper region of the vehicle windshield is typically not used, the radar sensor device 14 may be disposed thereat without being intrusive of other systems or elements and without adversely affecting the vehicle design and/or layout. The sensing system 10 is operable to detect objects or vehicles or the like in front of the vehicle as the vehicle is traveling along a road, such as in conjunction with an adaptive cruise control system or the like. Although shown and described as being a forward facing sensing system, aspects of the present invention may be suitable for other sensing systems, such as a rearward facing sensing system or the like.

Radar sensor device 14 thus may be disposed within a windshield electronics module 16 or accessory module or overhead console of the vehicle, and within the vehicle cabin, without experiencing the adverse performance caused by the attenuation of radio or radar frequency electromagnetic radiation wave transmission through the windshield glass. Optionally, the vehicle sheet metal may be adapted to receive and/or support the radar sensor device at the upper edge of the windshield, or to accommodate the radar sensor device as disposed in and/or supported by the windshield electronics module or the like.

In order to seal the upper edge of the windshield at the pocket 12b, a cover element or plate 18 may be provided that substantially or entirely spans the opening at the pocket and that is sealed at the glass windshield and vehicle around the perimeter of the pocket, so as to limit or substantially preclude water intrusion or the like into the vehicle at the radar sensor device. The cover element 18 preferably comprises a plastic or polymeric or polycarbonate material that is transmissive to radar waves so as to limit or substantially preclude an adverse effect on the performance of the radar sensor device and system. Optionally, and desirably, the cover element may be colored to match or substantially match the shade band along the upper region of the windshield or to match or substantially match the windshield electronics module or other interior or exterior component of the vehicle. Because the radar sensor device does not require a transparent cover, the cover element may be opaque or substantially opaque and/or may function to substantially camouflage or render covert the sensor device and/or the windshield electronics module or the like.

The radar sensor device may utilize known transmitting and receiving technology and may utilize a sweeping beam or a phased array or the like for scanning or sensing or interrogating the area in front of the vehicle. Optionally, the forward facing radar sensing system may include or may be associated with a forward facing camera or imaging sensor 20 (which may be disposed at or in the windshield electronics module or accessory module or overhead console or at another accessory module or windshield electronics module or at the interior rearview mirror assembly 22 or the like), which has a forward field of view in the forward direction of travel of the vehicle. The sensing system may function to perform a "sweep" of the area in front of the vehicle and if an object or the like is detected (e.g., the radar sensing system detects a "blip"), the radar sensor device and system may hone in on or focus on or further interrogate the region where the object is detected and may perform a more focused or enhanced interrogation of the area at which the object was detected to determine if the object is an object of interest. Optionally, for example, the system may control enhanced interrogation of a detected object by the radar sensor device (such as a beam aiming or beam selection technique, such as by digital beam forming in a phased array antenna system or such as by digital beam steering). Such enhanced interrogation by the radar sensor device may be in response to the forward facing image sensor detecting an object in its forward field of view.

Optionally, and desirably, the forward facing camera may guide or initiate or control the more focused interrogation of the suspected object of interest (such as further or enhanced interrogation by the camera and imaging system) in response to the initial detection by the radar sensing system. For example, the radar sensing system may initially detect an object and the forward facing camera may be directed toward the detected object or otherwise controlled or processed to further interrogate the detected object (or area at which the object is detected) via the camera and image processing, or, alternately, the forward facing camera may initially detect an object and the system may select or aim a radar beam in a direction of a detected object. The enhanced interrogation of the object area by the forward facing camera may be accomplished via control of the camera's field of view or degree of zoom [for example, the camera may zoom into the area (via adjustment of a lens of the camera to enlarge an area of the field of view for enhanced processing) at which the object is detected] or via control of the image processing techniques. For example, the image processor may provide enhanced processing of the captured image data at the area or zone at which the object is detected, such as by enhanced or intensified algorithmic processing of a portion of the image plane of the image sensor that is spatially related to the location of the detected object in the forward field of view of the image sensor, such as by enhanced processing of pixel outputs of pixels within a zone or sub-array of a pixelated imaging array sensor, such as by utilizing aspects of the imaging systems described in U.S. Pat. Nos. 7,123,168; 7,038,577; 7,004,606; 6,690,268; 6,396,397; 5,550,677; 5,670,935; 5,796,094; 5,877,897; and 6,498,620, and/or U.S. patent applications, Ser. No. 11/239,980, filed Sep. 30, 2005, now U.S. Pat. No. 7,881,496; and/or Ser. No. 11/315,675, filed Dec. 22, 2005, now U.S. Pat. No. 7,720,580, which are all hereby incorporated herein by reference in their entireties.

Thus, the sensing system of the present invention provides for cooperation or collaboration between the radar sensor device and the forward facing camera or image sensor in a way that benefits or enhances the sensing capabilities of the forward facing sensing system. The sensing system may thus operate with reduced processing until an object is initially detected, and then may provide further processing to determine if the object is an object of interest to the forward facing sensing system.

Optionally, and desirably, the radar sensor device and forward facing camera may be commonly established on a semiconductor substrate, such as a substrate comprising a germanium substrate, a gallium arsenide substrate or a silicon germanium substrate or the like. The substrate may include or may incorporate at least some of the control circuitry for the radar sensor device and camera and/or may include or incorporate common circuitry for the radar sensor device and camera.

Because the radar sensor device and camera may be disposed on a common substrate and/or may be disposed within a windshield electronics module or the like, the forward facing sensing system may be removably installed at the vehicle and may be removed therefrom, such as for service or replacement. Thus, the sensing system (including the radar sensor device and camera) may comprise a self-contained unit or system that is disposed at the upper region of the windshield. Optionally, the radar sensor device and/or camera may be disposed within a windshield electronics module or the like, such as by utilizing aspects of the modules described in U.S. pat. applications, Ser. No. 10/958,087, filed Oct. 4, 2004, now U.S. Pat. No. 7,188,963; and/or Ser. No. 11/201,661, filed Aug. 11, 2005, now U.S. Pat. No. 7,480,149, and/or U.S. Pat. Nos. 7,004,593; 6,824,281; 6,690,268; 6,250,148; 6,341,523; 6,593,565; 6,428,172; 6,501,387; 6,329,925; and 6,326,613, and/or in PCT Application No. PCT/US03/40611, filed Dec. 19, 2003 and published Jul. 15, 2004 as International Publication No. WO 2004/058540, and/or Ireland pat. applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference in their entireties.

Optionally, the mirror assembly and/or windshield electronics module may include or incorporate a display, such as a static display, such as a static video display screen (such as a display utilizing aspects of the displays described in U.S. Pat. Nos. 5,530,240 and/or 6,329,925, which are hereby incorporated herein by reference in their entireties, or a display-on-demand or transflective type display or other display utilizing aspects of the displays described in U.S. Pat. Nos. 6,690,268; 5,668,663 and/or 5,724,187, and/or U.S. patent application Ser. No. 10/054,633, filed Jan. 22, 2002, now U.S. Pat. No. 7,195,381; Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published on Mar. 9, 2006 as U.S. Publication No. US 2006/0050018; Ser. No. 11/226,628, filed Sep. 14, 2005 and published Mar. 23, 2006 as U.S. Publication No. US 2006/0061008; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983, and/or PCT Patent Application No. PCT/US2006/018567, filed May 15, 2006 and published Nov. 23, 2006 as International Publication No. WO 2006/124682; and/or PCT Application No. PCT/US2006/042718, filed Oct. 31, 2006, published May 10, 2007 as International Publication No. WO 07/053710; and U.S. provisional applications, Ser. No. 60/836,219, filed Aug. 8, 2006; Ser. No. 60/759,992, filed Jan. 18, 2006; and Ser. No. 60/732,245, filed Nov. 1, 2005, and/or PCT Application No. PCT/US03/40611, filed Dec. 19, 2003, and published Jul. 15, 2004 as International Publication No. WO 2004/058540, which are all hereby incorporated herein by reference in their entireties). Alternately, the display screen may comprise a display (such as a backlit LCD video display) that is movable to extend from the mirror casing when activated, such as a slide-out display of the types described in U.S. pat. applications, Ser. No. 10/538,724, filed Jun. 13, 2005 and published on Mar. 9, 2006 as U.S. Publication No. US 2006/0050018; and/or Ser. No. 11/284,543, filed Nov. 22, 2005, now U.S. Pat. No. 7,370,983, and/or PCT Patent Application No. PCT/US2006/018567, filed May 15, 2006 and published Nov. 23, 2006 as International Publication No. WO 2006/124682; and/or PCT Application No. PCT/US2006/042718, filed Oct. 31, 2006, and published May 10, 2007 as International Publication No. WO 07/053710; and U.S. provisional applications, Ser. No. 60/836,219, filed Aug. 8, 2006; Ser. No. 60/759,992, filed Jan. 18, 2006; and Ser. No. 60/732,245, filed Nov. 1, 2005, which are all hereby incorporated herein by reference in their entireties. Optionally, and preferably, the display is episodically extended and/or actuated, such as to display driving instructions to the driver as the vehicle approaches a waypoint or turn along the selected route, and then retracted after the vehicle has passed the waypoint and continues along the selected route.

Optionally, the display on the video screen may be operable to display an alert to the driver of a potential hazardous condition detected ahead of or in the forward path of the vehicle. For example, an output of a forward-viewing active night vision system incorporating an imaging sensor or camera device and near-IR floodlighting (such as those described in U.S. Pat. No. 5,877,897 and U.S. patent application Ser. No. 11/651,726, filed Jan. 10, 2007, now U.S. Pat. No. 7,311,406, which are hereby incorporated herein by reference in their entireties), or an output of another suitable forward facing sensor or system such a passive far-IR thermal imaging night vision sensor/camera, may be processed by an image processor, such as, for example, an EyeQ™ image processing chip available from Mobileye Vision Technologies Ltd. of Jerusalem, Israel. Such image processors include object detection software (such as the types described in U.S. Pat. No. 7,038,577; and/or Ser. No. 11/315,675, filed Dec. 22, 2005, now U.S. Pat. No. 7,720,580, which are hereby incorporated herein by reference in their entireties), and they analyze image data to detect objects. The image processor or control may determine if a potentially hazardous condition (such as an object or vehicle or person or deer or the like) may exist in the vehicle path and may provide an alert signal (such as by actuation of a visual indicator or an audible indicator or by an enhancement/overlay on a video display screen that is showing a video image to the driver of what the night vision sensor/camera is seeing) to prompt/alert the driver of a potential hazard (such as a deer or a pedestrian or a fallen rock or the like) as needed or appropriate. The display thus may provide an episodal alert so that the driver's attention is drawn to the display alert only when there is a potential hazard detected. Such a system avoids the driver from having to look forward out the windshield while often looking to or watching a monitor running a video of the camera's output, which is not particularly consumer-friendly and simply loads the driver with yet another task.

Optionally, the mirror reflective element of the mirror assembly may comprise a prismatic mirror reflector or an electrically variable reflectance mirror reflector, such as an electro-optic reflective element assembly or cell, such as an electrochromic reflective element assembly or cell. For example, the rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; 4,824,221; 5,818,636; 6,166,847; 6,111,685; 6,392,783; 6,710,906; 6,798,556; 6,554,843; 6,420,036; 5,142,406; 5,442,478; and/or 4,712,879, and/or 4,712,879, and/or U.S. pat. applications, Ser. No. 10/054,633, filed Jan. 22, 2002, now U.S. Pat. No. 7,195,381; Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005, and published on Mar. 9, 2006 as U.S. Publication No. US 2006/0050018; Ser. No. 11/226,628, filed Sep. 14, 2005 and published Mar. 23, 2006 as U.S. Publication No. US 2006/0061008; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983, and/or International Pat. Publication Nos. WO 2004/098953, published Nov. 18, 2004; WO 2004/042457, published May 21, 2004; WO 2003/084780, published Oct. 16, 2003; and/or WO 2004/026633, published Apr. 1, 2004, which are all hereby incorporated herein by reference in their entireties, and/or such as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated herein by reference in their entireties.

Optionally, and preferably, the mirror reflective element may comprise a frameless reflective element, such as by utilizing aspects of the reflective elements described in PCT Application No. PCT/US2006/018567, filed May 15, 2006 and published Nov. 23, 2006 as International Publication No. WO2006/124682; PCT Application No. PCT/US2004/015424, filed May 18, 2004 and published on Dec. 2, 2004, as International Publication No. WO 2004/103772; and/or U.S. patent application Ser. No. 11/140,396, filed May 27, 2005, now U.S. Pat. No. 7,360,932; Ser. No. 11/226,628, filed Sep. 14, 2005, and published Mar. 23, 2006 as U.S. Publication No. US 2006/0061008; Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; and/or Ser. No. 10/538,724, filed Jun. 13, 2005, and published on Mar. 9, 2006 as U.S. Publication No. US 2006/0050018, which are hereby incorporated herein by reference in their entireties. Optionally, the reflective element may include a metallic perimeter band around the perimeter of the reflective element, such as by utilizing aspects of the reflective elements described in PCT Application No. PCT/US2006/018567, filed May 15, 2006 and published Nov. 23, 2006 as International Publication No. WO 2006/124682; PCT Application No. PCT/US03/29776, filed Sep. 19, 2003 and published Apr. 1, 2004 as International Publication No. WO 2004/026633; and/or PCT Application No. PCT/US03/35381, filed Nov. 5, 2003 and published May 21, 2004 as International Publication No. WO 2004/042457; and/or U.S. pat. applications, Ser. No. 11/021,065, filed Dec. 23, 2004, now U.S. Pat. No. 7,255,451; and/or Ser. No. 11/226,628, filed Sep. 14, 2005 and published Mar. 23, 2006 as U.S. Publication No. US 2006/0061008, which is hereby incorporated herein by reference in their entireties. The frameless reflective element thus is aesthetically pleasing to a person viewing the mirror assembly, since the reflective element (as recessed or partially recessed in the opening of the bezel portion of the mirror casing) does not include a separate frame or bezel portion around its perimeter edge. The metallic perimeter band may be selected to have a desired color or tint to match or contrast a color scheme or the like of the vehicle, such as described in PCT Application No. PCT/US2006/018567, filed May 15, 2006 and published Nov. 23, 2006 as International Publication No. WO 2006/124682; and/or PCT Application No. PCT/US2004/015424, filed May 18, 2004 and published Dec. 2, 2004 as International Publication No. WO 2004/103772, which are hereby incorporated herein by reference in their entireties.

Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. pat. application, Ser. No. 10/993,302, filed Nov. 19, 2004, now U.S. Pat. No. 7,338,177, which are all hereby incorporated herein by reference in their entireties, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the mirror assembly may comprise a prismatic mirror assembly, such as a prismatic mirror assembly utilizing aspects described in U.S. Pat. Nos. 6,318,870; 6,598,980; 5,327,288; 4,948,242; 4,826,289; 4,436,371; and 4,435,042; and PCT Application No. PCT/US04/015424, filed May 18, 2004 and published Dec. 2, 2004 as International Publication No. WO 2004/103772; and U.S. pat. application, Ser. No. 10/933,842, filed Sep. 3, 2004, now U.S. Pat. No. 7,249,860, which are hereby incorporated herein by reference in their entireties. Optionally, the prismatic reflective element may comprise a conventional prismatic reflective element or prism, or may comprise a prismatic reflective element of the types described in PCT Application No. PCT/US03/29776, filed Sep. 19, 2003 and published Apr. 1, 2004 as International Publication No. WO 2004/026633; and/or U.S. pat. applications, Ser. No. 10/709,434, filed May 5, 2004, now U.S. Pat. No. 7,420,756; Ser. No. 10/933,842, filed Sep. 3, 2004, now U.S. Pat. No. 7,249,860; Ser. No. 11/021,065, filed Dec. 23, 2004, now U.S. Pat. No. 7,255,451; Ser. No. 10/528,269, filed Mar. 17, 2005, now U.S. Pat. No. 7,274,501; and/or Ser. No. 10/993,302, filed Nov. 19, 2004, now U.S. Pat. No. 7,338,177, and/or PCT Application No. PCT/US2004/015424, filed May 18, 2004 and published Dec. 2, 2004 as International Publication No. WO 2004/103772, which are all hereby incorporated herein by reference in their entireties, without affecting the scope of the present invention.

Optionally, the reflective element may comprise a bent, wide-angle mirror reflector rather than a flat mirror reflector. If a bent, wide-angle mirror reflector is used, it is preferable that the mirror reflector comprise a glass substrate coated with a bendable reflector coating (such as of silicon as described in U.S. Pat. Nos. 6,065,840; 5,959,792; 5,535,056 and 5,751,489, which are hereby incorporated by reference herein in their entireties.

Optionally, the mirror casing and/or windshield electronics module may be suitable for supporting larger or heavier components or circuitry that otherwise may not have been suitable for mounting or locating at or in a mirror casing. For example, the mirror casing or module may house or support a battery or power pack for various electronic features or components, and/or may support a docking station for docking and/or holding a cellular telephone or hand-held personal data device or the like, such as by utilizing aspects of the systems described in U.S. Pat. No. 6,824,281, and/or PCT Application No. PCT/US03/40611, filed Dec. 19, 2003 and published Jul. 15, 2004 as International Publication No. WO 2004/058540, and/or U.S. patent application Ser. No. 10/510,813, filed Aug. 23, 2002, now U.S. Pat. No. 7,306,276, and/or U.S. patent application Ser. No. 11/842,328, filed Aug. 21, 2007, now U.S. Pat. No. 7,722,199, and Ser. No. 11/861,904, filed Sep. 26, 2007, now U.S. Pat. No. 7,937,667, and/or U.S. provisional application, Ser. No. 60/839,446, filed Aug. 23, 2006; Ser. No. 60/879,619, filed Jan. 10, 2007; Ser. No. Ser. No. 60/850,700, filed Oct. 10, 2006; and/or Ser. No. 60/847,502, filed Sep. 27, 2006, which are hereby incorporated herein by reference in their entireties.

Optionally, the mirror assembly and/or windshield electronics module may include or incorporate a navigation device that may include navigational circuitry and a GPS antenna to determine the geographical location of the vehicle and to provide routes to targeted or selected destinations, such as by utilizing aspects of known navigational devices and/or the devices of the types described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,946,978; 6,477,464; 6,678,614; and/or 7,004,593, and/or U.S. pat. applications, Ser. No. 10/645,762, filed Aug. 20, 2003, now U.S. Pat. No. 7,167,796; Ser. No. 10/529,715, filed Mar. 30, 2005, now U.S. Pat. No. 7,657,052; Ser. No. 10/538,724, filed Jun. 13, 2005 and published Mar. 9, 2006 as U.S. Publication No. 2006/0050018; Ser. No. 11/861,904, filed Sep. 26, 2007, now U.S. Pat. No. 7,937,667; and/or Ser. No. 10/964,512, filed Oct. 13, 2004, now U.S. Pat. No. 7,308,341, and/or U.S. provisional applications, Ser. No. 60/879,619, filed Jan. 10, 2007; Ser. No. Ser. No. 60/850,700, filed Oct. 10, 2006; and/or Ser. No. 60/847,502, filed Sep. 27, 2006, which are all hereby incorporated herein by reference in their entireties. Optionally, the mirror or navigation device may include a microphone, whereby the mirror or navigation device may provide voice activated control of the navigation device.

Optionally, for example, the mounting structure and/or mirror casing and/or windshield electronics module may support compass sensors, such as compass sensors of the types described in may utilize aspects of the compass systems described in U.S. patent application Ser. No. 11/305,637, filed Dec. 16, 2005, now U.S. Pat. No. 7,329,013; Ser. No. 10/352,691, filed Jan. 28, 2003, now U.S. Pat. No. 6,922,902; Ser. No. 11/284,543, filed Nov. 22, 2005, now U.S. Pat. No. 7,370,983; Ser. No. 11/226,628, filed Sep. 14, 2005, and published on Mar. 23, 2006 as U.S. Publication No. 2006/0061008; and/or Ser. No. 10/933,842, filed Sep. 3, 2004, now U.S. Pat. No. 7,249,860; and/or U.S. Pat. Nos. 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and 6,642,851, and/or PCT Application No. PCT/US2004/015424, filed May 18, 2004 and published Dec. 2, 2004 as International Publication No. WO 2004/103772, and/or European patent application, published Oct. 11, 2000 under Publication No. EP 0 1043566, which are all hereby incorporated herein by reference in their entireties. The compass circuitry may include the compass sensor, such as a magneto-responsive sensor, such as a magneto-resistive sensor, such as the types disclosed in U.S. Pat. Nos. 5,255,442; 5,632,092; 5,802,727; 6,173,501; 6,427,349; and 6,513,252 (which are hereby incorporated herein by reference in their entireties), a magneto-capacitive sensor, a Hall-effect sensor, such as the types described in U.S. Pat. Nos. 6,278,271; 5,942,895 and 6,184,679 (which are hereby incorporated herein by reference in their entireties), a magneto-inductive sensor, such as described in U.S. Pat. No. 5,878,370 (which is hereby incorporated herein by reference in its entirety), a magneto-impedance sensor, such as the types described in PCT Publication No. WO 2004/076971, published Sep. 10, 2004 (which is hereby incorporated herein by reference in its entirety), or a flux-gate sensor or the like, and/or may comprise a compass chip, such as described in U.S. patent application Ser. No. 11/226,628, filed Sep. 14, 2005, and published on Mar. 23, 2006 as U.S. Publication No. 2006/0061008; and/or Ser. No. 11/284,543, filed Nov. 22, 2005, now U.S. Pat. No. 7,370,983, which are hereby incorporated herein by reference in their entireties. By positioning the compass sensors at a fixed location, further processing and calibration of the sensors to accommodate adjustment or movement of the sensors is not necessary.

Optionally, the mounting structure and/or mirror casing and/or windshield electronics module may support one or more imaging sensors or cameras, and may fixedly support them with the cameras set with a desired or appropriate forward and/or rearward field of view. For example, the camera may be operable in conjunction with a forward facing imaging system, such as a rain sensing system, such as described in U.S. Pat. Nos. 6,968,736; 6,806,452; 6,516,664; 6,353,392; 6,313,454; 6,250,148; 6,341,523; and 6,824,281, and in U.S. pat. applications, Ser. No. 10/958,087, filed Oct. 4, 2004, now U.S. Pat. No. 7,188,963; and/or Ser. No. 11/201,661, filed Aug. 11, 2005, now U.S. Pat. No. 7,480,149, which are all hereby incorporated herein by reference in their entireties. The mounting structure and/or mirror casing may be pressed or loaded against the interior surface of the windshield to position or locate the image sensor in close proximity to the windshield and/or to optically couple the image sensor at the windshield. The mounting structure and/or mirror casing may include an aperture or apertures at its forward facing or mounting surface and the windshield may include apertures through the opaque frit layer (typically disposed at a mirror mounting location of a windshield) or the windshield may not include such a frit layer, depending on the particular application.

Optionally, the image sensor may be operable in conjunction with a forward or rearward vision system, such as an automatic headlamp control system and/or a lane departure warning system or object detection system and/or other forward vision or imaging systems, such as imaging or vision systems of the types described in U.S. Pat. Nos. 7,038,577; 7,005,974; 7,004,606; 6,690,268; 6,946,978; 6,757,109; 6,717,610; 6,396,397; 6,201,642; 6,353,392; 6,313,454; 5,550,677; 5,670,935; 5,796,094; 5,715,093; 5,877,897; 6,097,023; and 6,498,620, and/or U.S. patent application Ser. No. 09/441,341, filed Nov. 16, 1999, now U.S. Pat. No. 7,339,149; Ser. No. 10/422,512, filed Apr. 24, 2003, now U.S. Pat. No. 7,123,168; Ser. No. 11/239,980, filed Sep. 30, 2005, now U.S. Pat. No. 7,881,496; Ser. No. 11/672,070, filed Feb. 7, 2007; and/or Ser. No. 11/315,675, filed Dec. 22, 2005, now U.S. Pat. No. 7,720,580, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/731,183, filed Oct. 28, 2005; and/or Ser.

No. 60/765,797, filed Feb. 7, 2006, and/or International PCT Application No. PCT/US2006/041709, filed Oct. 27, 2006, and published May 10, 2007 as International Publication No. WO 07/053404, which are hereby incorporated herein by reference in their entireties. The mirror casing thus may support one or more rearward facing imaging sensors or cameras, such as for rearward vision or imaging systems, such as for a rear vision system or back up aid of the types described in U.S. Pat. Nos. 6,717,610 and/or 6,201,642 (which are hereby incorporated herein by reference in their entireties), and/or a cabin monitoring system or baby view system of the types described in U.S. Pat. No. 6,690,268 (which is hereby incorporated herein by reference in its entirety), and/or the like.

Optionally, the fixed mounting structure and/or mirror casing and/or windshield electronics module may house or support a display device, such as a heads up display device (such as the types described in U.S. patent application Ser. No. 11/105,757, filed Apr. 14, 2005, now U.S. Pat. No. 7,526,103; and Ser. No. 11/029,695, filed Jan. 5, 2005, now U.S. Pat. No. 7,253,723, which are hereby incorporated herein by reference in their entireties) that is operable to project a display at the area in front of the driver to enhance viewing of the display information without adversely affecting the driver's forward field of view. For example, the mirror casing may support a heads up display (HUD), such as a MicroHUD™ head-up display system available from MicroVision Inc. of Bothell, Wash., and/or such as a HUD that utilizes aspects described in U.S. patent application Ser. No. 11/105,757, filed Apr. 14, 2005, now U.S. Pat. No. 7,526,103; and Ser. No. 11/029,695, filed Jan. 5, 2005, now U.S. Pat. No. 7,253,723, which are hereby incorporated herein by reference in their entireties. For example, MicroVision's MicroHUD™ combines a MEMS-based micro display with an optical package of lenses and mirrors to achieve a compact high-performance HUD module that reflects a virtual image off the windscreen that appears to the driver to be close to the front of the car. This laser-scanning display can outperform many miniature flat panel LCD display screens because it can be clearly viewed in the brightest conditions and also dimmed to the very low brightness levels required for safe night-time driving. For example, such a display device may be located at or in the mirror casing/mounting structure/windshield electronics module and may be non-movably mounted at the mirror casing or mounting structure or windshield electronics module, and may be operable to project the display information at the windshield of the vehicle so as to be readily viewed by the driver of the vehicle in the driver's forward field of view.

The mounting structure and/or mirror casing and/or windshield electronics module may be fixedly attached to or supported at the vehicle windshield and may extend upward toward the headliner of the vehicle. Thus, the mirror assembly of the present invention may have enhanced wire management and may substantially conceal the wiring of the electronic components/accessories between the circuitry within the mirror casing and the headliner at the upper portion of the vehicle windshield. Optionally, the mirror assembly may include wire management elements, such as the types described in U.S. patent applications, Ser. No. 11/226,628, filed Sep. 14, 2005, and published Mar. 23, 2006 as U.S. Publication No. 2006/0061008; and/or Ser. No. 11/584,697, filed Oct. 20, 2006, now U.S. Pat. No. 7,510,287; and/or U.S. provisional application, Ser. No. Ser. No. 60/729,430, filed Oct. 21, 2005, which are hereby incorporated herein by reference in their entireties, to conceal the wires extending between an upper portion of the mirror casing and the vehicle headliner (or overhead console). Optionally, the mirror casing and/or mounting structure and/or windshield electronics module may abut the headliner and/or may be an extension of an overhead console of the vehicle (such as by utilizing aspects described in U.S. patent application Ser. No. 10/538,724, filed Jun. 13, 2005 and published Mar. 9, 2006 as U.S. Publication No. 2006/0050018, and/or U.S. patent application Ser. No. 10/510,813, filed Aug. 23, 2002, now U.S. Pat. No. 7,306,276, which are hereby incorporated herein by reference in their entireties). The mirror assembly of the present invention thus may allow for utilization of the area above the mirror reflective element for additional mirror content, such as additional electronic accessories or circuitry, and thus may provide for or accommodate additional mirror content/circuitry and/or vehicle content/circuitry.

Optionally, the mirror assembly and/or reflective element assembly may include one or more displays, such as for the accessories or circuitry described herein. The displays may comprise any suitable display, such as displays of the types described in U.S. Pat. Nos. 5,530,240 and/or 6,329,925, which are hereby incorporated herein by reference in their entireties, or may be display-on-demand or transflective type displays or other displays, such as the types described in U.S. Pat. Nos. 6,690,268; 5,668,663 and/or 5,724,187, and/or U.S. pat. applications, Ser. No. 10/054,633, filed Jan. 22, 2002, now U.S. Pat. No. 7,195,381; Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. 2006/0050018; Ser. No. 11/226,628, filed Sep. 14, 2005 and published Mar. 23, 2006 as U.S. Publication No. 2006/0061008; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983, and/or PCT Patent Application No. PCT/US2006/018567, filed May 15, 2006 and published Nov. 23, 2006 as International Publication No. WO 2006/124682; and/or PCT Application No. PCT/US2006/042718, filed Oct. 31, 2006, and published May 10, 2007 as International Publication No. WO 07/053710; and/or U.S. provisional applications, Ser. No. 60/836,219, filed Aug. 8, 2006; Ser. No. 60/759,992, filed Jan. 18, 2006; and Ser. No. 60/732,245, filed Nov. 1, 2005, and/or PCT Application No. PCT/US03/40611, filed Dec. 19, 2003 and published Jul. 15, 2004 as International Publication No. WO 2004/058540, which are all hereby incorporated herein by reference in their entireties, or may include or incorporate video displays or the like, such as the types described in U.S. Pat. No. 6,690,268 and/or PCT Application No. PCT/US03/40611, filed Dec. 19, 2003 and published Jul. 15, 2004 as International Publication No. WO 2004/058540, U.S. patent application Ser. No. 10/538,724, filed Jun. 13, 2005, and published Mar. 9, 2006 as U.S. Publication No. 2006/0050018; and/or Ser. No. 11/284,543, filed Nov. 22, 2005, now U.S. Pat. No. 7,370,983, which are hereby incorporated herein by reference in their entireties. Optionally, the mirror assembly may include a video display that is selectively positionable, such as extendable/retractable or pivotable or foldable so as to be selectively positioned at a side or below the mirror casing when in use and storable within or at least partially within the mirror casing when not in use. The display may automatically extend/pivot to the in-use position in response to an actuating event, such as when the vehicle is shifted into its reverse gear for a rear vision system or back up aid.

Such a video mirror display (or other display) may be associated with a rearward facing camera at a rear of the vehicle and having a rearward field of view, such as at the license plate holder of the vehicle or at a rear trim portion (such as described in U.S. patent application Ser. No. 11/672, 070, filed Feb. 7, 2007, and U.S. provisional application Ser. No. 60/765,797, filed Feb. 7, 2006, which is hereby incorporated herein by reference in its entirety). The image data captured by the rearward facing camera may be communicated to the control or video display at the rearview mirror assembly (or elsewhere in the vehicle, such as at an overhead console or accessory module or the like) via any suitable communication means or protocol. For example, the image data may be communicated via a fiber optic cable or a twisted pair of wires, or may be communicated wirelessly, such as via a BLUETOOTH® communication link or protocol or the like, or may be superimposed on a power line, such as a 12 volt power line of the vehicle, such as by utilizing aspects of the systems described in U.S. patent application Ser. No. 11/239,980, filed Sep. 30, 2005, now U.S. Pat. No. 7,881,496, which is hereby incorporated herein by reference in its entirety.

Optionally, the mirror assembly may include one or more user inputs for controlling or activating/deactivating one or more electrical accessories or devices of or associated with the mirror assembly. For example, the mirror assembly may comprise any type of switches or buttons, such as touch or proximity sensing switches, such as touch or proximity switches of the types described in PCT Application No. PCT/US03/40611, filed Dec. 19, 2003 and published Jul. 15, 2004 as International Publication No. WO 2004/058540; and/or PCT Application No. PCT/US2004/015424, filed May 18, 2004 and published Dec. 2, 2004 as International Publication No. WO 2004/103772, and/or U.S. Pat. Nos. 6,001,486; 6,310,611; 6,320,282; and 6,627,918; and/or U.S. patent application Ser. No. 11/021,065, filed Dec. 23, 2004, now U.S. Pat. No. 7,255,451; and/or U.S. pat. applications, Ser. No. 09/817,874, filed Mar. 26, 2001, now U.S. Pat. No. 7,224,324; Ser. No. 10/956,749, filed Oct. 1, 2004, now U.S. Pat. No. 7,446,924; Ser. No. 10/933,842, filed Sep. 3, 2004, now U.S. Pat. No. 7,249,860; Ser. No. 11/021,065, filed Dec. 23, 2004, now U.S. Pat. No. 7,255,451; and/or Ser. No. 11/140,396, filed May 27, 2005, now U.S. Pat. No. 7,360,932, which are hereby incorporated herein by reference in their entireties, or the inputs may comprise other types of buttons or switches, such as those described in U.S. Pat. No. 6,501,387, and/or U.S. pat. applications, Ser. No. 11/029,695, filed Jan. 5, 2005, now U.S. Pat. No. 7,253,723; and/or Ser. No. 11/451,639, filed Jun. 13, 2006, now U.S. Pat. No. 7,527,403, which are hereby incorporated herein by reference in their entireties, or such as fabric-made position detectors, such as those described in U.S. Pat. Nos. 6,504,531; 6,501,465; 6,492,980; 6,452,479; 6,437,258; and 6,369,804, which are hereby incorporated herein by reference in their entireties. Other types of switches or buttons or inputs or sensors may be incorporated to provide the desired function, without affecting the scope of the present invention. The manual inputs or user actuatable inputs or actuators may control or adjust or activate/deactivate one or more accessories or elements or features. For touch sensitive inputs or applications or switches, the mirror assembly or accessory module or input may, when activated, provide a positive feedback (such as activation of an illumination source or the like, or such as via an audible signal, such as a chime or the like, or a tactile or haptic signal, or a rumble device or signal or the like) to the user so that the user is made aware that the input was successfully activated.

Optionally, the user inputs or buttons may comprise user inputs for a garage door opening system, such as a vehicle based garage door opening system of the types described in U.S. Pat. Nos. 7,023,322; 6,396,408; 6,362,771; and 5,798, 688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,946,978; 6,477,464; 6,678,614; and/or 7,004,593, and/or U.S. pat. applications, Ser. No. 10/645,762, filed Aug. 20, 2003, now U.S. Pat. No. 7,167,796; Ser. No. 10/529,715, filed Mar. 30, 2005, now U.S. Pat. No. 7,657,052; Ser. No. 10/538,724, filed Jun. 13, 2005 and published Mar. 9, 2006 as U.S. Publication No. 2006/0050018; and/or Ser. No. 10/964,512, filed Oct. 13, 2004, now U.S. Pat. No. 7,308,341, which are all hereby incorporated herein by reference in their entireties.

Optionally, the display and inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,877,888; 6,690,268; 6,824,281; 6,672,744; 6,386,742; and 6,124,886, and/or PCT Application No. PCT/US03/40611, filed Dec. 19, 2003 and published Jul. 15, 2004 as International Publication No. WO 2004/058540, and/or PCT Application No. PCT/US04/15424, filed May 18, 2004 and published Dec. 2, 2004 as International Publication No. WO 2004/103772, and/or U.S. patent application Ser. No. 10/510,813, filed Aug. 23, 2002, now U.S. Pat. No. 7,306,276, which are hereby incorporated herein by reference in their entireties.

Optionally, the mirror assembly or accessory module may fixedly or non-movably support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 6,971,775; and/or 5,669,698, and/or U.S. patent application Ser. No. 10/054,633, filed Jan. 22, 2002, now U.S. Pat. No. 7,195,381; and/or Ser. No. 10/933,842, filed Sep. 3, 2004, now U.S. Pat. No. 7,249,860, which are hereby incorporated herein by reference in their entireties, may be included in the mirror assembly. The illumination sources and/or the circuit board may be connected to one or more buttons or inputs for activating and deactivating the illumination sources.

Optionally, the mirror assembly may also or otherwise include other accessories, such as microphones, such as analog microphones or digital microphones or the like, such as microphones of the types disclosed in U.S. Pat. Nos. 6,243,003; 6,278,377; and/or 6,420,975, and/or in U.S. patent application Ser. No. 10/529,715, filed Mar. 30, 2005, now U.S. Pat. No. 7,657,052. Optionally, the mirror assembly may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection and/or indication system, such as disclosed in U.S. Pat. Nos. 7,038,577; 6,882,287; 5,929,786 and/or 5,786,772, and/or U.S. pat. application, Ser. No. 11/315,675, filed Dec. 22, 2005, now U.S. Pat. No. 7,720,580; and/or PCT Application No. PCT/US2006/026148, filed Jul. 5, 2006 and published Jan. 11, 2007 as International Publication No. WO 2007/005942, transmitters and/or receivers, such as for a garage door opener or a vehicle door unlocking system or the like (such as a remote keyless entry system), a digital network, such as described in U.S. Pat. No. 5,798,575, a hands-free phone attachment, an imaging system or components or circuitry or display thereof, such as an imaging and/or display system of the types described in U.S. Pat. Nos. 6,690,268 and 6,847,487; and/or U.S. provisional applications, Ser. No. 60/614,644, filed Sep. 30, 2004; Ser. No. 60/618,686, filed Oct. 14, 2004; and/or Ser. No. 60/628,709, filed Nov. 17, 2004; and/or U.S. pat. applications, Ser. No. 11/105,757, filed Apr. 14, 2005, now U.S. Pat. No. 7,526,103; Ser. No. 11/334,139, filed Jan. 18, 2006, now U.S. Pat. No. 7,400,435; and/or Ser. No. 11/239,980, filed Sep. 30, 2005, now U.S. Pat. No. 7,881,496, a video device for internal cabin surveillance (such as for sleep detection or driver drowsiness detection or the like) and/or video telephone function, such as disclosed in U.S. Pat. Nos. 5,760,962 and/or 5,877,897, an occupant detection system and/or interior cabin monitoring system (such as the types described in U.S. Pat. Nos. 6,019,411 and/or 6,690,268, and/or PCT Application No. PCT/US2005/042504, filed Nov. 22, 2005 and published Jun. 1, 2006 as International Publication No. WO 2006/058098 A2; and/or PCT Application No. PCT/US94/01954, filed Feb. 25, 1994, a heating element, particularly for an exterior mirror application, such as the types described in U.S. patent application Ser. No. 11/334,139, filed Jan. 18, 2006, now U.S. Pat. No. 7,400,435, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; and/or 6,731,205; and/or U.S. patent application Ser. No. 11/232,324, filed Sep. 21, 2005, now U.S. Pat. No. 7,423,522, and/or an ONSTAR® system and/or any other accessory or circuitry or the like (with all of the above-referenced U.S. patents and PCT applications and U.S. patent applications and U.S. provisional applications being commonly assigned, and with the disclosures of the referenced U.S. patents and PCT applications and U.S. patent applications and U.S. provisional applications being hereby incorporated herein by reference in their entireties).

Changes and modifications to the specifically described embodiments may be carried out without departing from the principles of the present invention, which is intended to be limited only by the scope of the appended claims as interpreted according to the principles of patent law.

The invention claimed is:

1. A forward facing sensing system for a vehicle, the vehicle having a windshield, said forward facing sensing system comprising:

a radar sensor device disposed within an interior cabin of a vehicle equipped with said forward facing sensing system, and wherein said radar sensor device has a sensing direction forward of the equipped vehicle;

wherein said radar sensor device comprises an array antenna and wherein said radar sensor device utilizes digital beam forming;

an image sensor disposed within the interior cabin of the equipped vehicle and wherein said image sensor has a viewing direction forward of the equipped vehicle;

wherein said image sensor comprises a pixelated image array sensor having a two dimensional array of photosensing elements;

wherein said image sensor is at least one of (a) proximate to a windshield of the equipped vehicle and (b) optically coupled at a windshield of the equipped vehicle;

wherein said radar sensor device and said image sensor are disposed behind the vehicle windshield in a windshield electronics module;

a control comprising an image processor;

wherein said image processor processes image data captured by said image sensor utilizing object detection software;

wherein processing by said image processor of image data captured by said image sensor utilizing object detection software comprises processing of pixel outputs within a sub-array of said image sensor;

wherein said image processor is operable to analyze image data captured by said image sensor in order to, at least in part, detect an object present forward of the equipped vehicle in its direction of forward travel;

wherein said control, responsive at least in part to processing by said image processor of captured image data and to an output of said radar sensor device, determines that a potentially hazardous condition may exist in the path of forward travel of the equipped vehicle, and wherein said potentially hazardous condition comprises another vehicle in the path of forward travel of the equipped vehicle;

wherein said radar sensor device and said image sensor collaborate in a way that enhances the sensing capability of said sensing system for determining the potentially hazardous condition in the path of forward travel of the equipped vehicle;

wherein, responsive to said control determining that a potentially hazardous condition exists in the path of forward travel of the equipped vehicle, said control generates an alert, and wherein said alert comprises at least one of (i) a visual indication and (ii) an audible indication;

wherein said image sensor comprises part of an automatic headlamp control system of the equipped vehicle and wherein said image sensor comprises part of a lane departure warning system of the equipped vehicle; and wherein said control, responsive at least in part to processing by said image processor of captured image data and to an output of said radar sensor device, at least in part controls an adaptive cruise control system of the equipped vehicle.

2. The sensing system of claim 1, wherein at least one of (a) said radar sensor device utilizes at least one of beam aiming and beam selection, (b) said radar sensor device utilizes digital beam steering, and (c) said radar sensor device comprises a phased array antenna.

3. The sensing system of claim 1, wherein said radar sensor device and said image sensor share, at least in part, common circuitry.

4. The sensing system of claim 1, wherein said alert comprises a visual indication comprising at least one of (i) an enhancement of an image displayed on a display screen disposed in the interior cabin of the equipped vehicle and (ii) an overlay on an image displayed on a display screen disposed in the interior cabin of the equipped vehicle.

5. A forward facing sensing system for a vehicle, the vehicle having a windshield, said forward facing sensing system comprising:
- a radar sensor device disposed within an interior cabin of a vehicle equipped with said forward facing sensing system, and wherein said radar sensor device has a sensing direction forward of the equipped vehicle;
- wherein said radar sensor device comprises an array antenna and wherein said radar sensor device utilizes digital beam forming;
- an image sensor disposed within the interior cabin of the equipped vehicle and wherein said image sensor has a viewing direction forward of the equipped vehicle;
- wherein said image sensor comprises a pixelated image array sensor having a two dimensional array of photo-sensing elements;
- wherein said image sensor is at least one of (a) proximate to a windshield of the equipped vehicle and (b) optically coupled at a windshield of the equipped vehicle;
- wherein said radar sensor device and said image sensor are disposed behind the vehicle windshield in a windshield electronics module;
- a control comprising an image processor;
- wherein said image processor processes image data captured by said image sensor utilizing object detection software;
- wherein processing by said image processor of image data captured by said image sensor utilizing object detection software comprises processing of pixel outputs within a sub-array of said image sensor;
- wherein said image processor is operable to analyze image data captured by said image sensor in order to, at least in part, detect an object present forward of the equipped vehicle in its direction of forward travel;
- wherein said control, responsive at least in part to processing by said image processor of captured image data and to an output of said radar sensor device, determines that a potentially hazardous condition may exist in the path of forward travel of the equipped vehicle, and wherein said potentially hazardous condition comprises a person in the path of forward travel of the equipped vehicle;
- wherein said radar sensor device and said image sensor collaborate in a way that enhances the sensing capability of said sensing system for determining the potentially hazardous condition in the path of forward travel of the equipped vehicle;
- wherein, responsive to said control determining that a potentially hazardous condition exists in the path of forward travel of the equipped vehicle, said control generates an alert, and wherein said alert comprises at least one of (i) a visual indication and (ii) an audible indication;
- wherein said image sensor comprises part of an automatic headlamp control system of the equipped vehicle and wherein said image sensor comprises part of a lane departure warning system of the equipped vehicle; and
- wherein said control, responsive at least in part to processing by said image processor of captured image data and to an output of said radar sensor device, at least in part controls an adaptive cruise control system of the equipped vehicle.

6. The sensing system of claim 5, wherein at least one of (a) said radar sensor device utilizes at least one of beam aiming and beam selection, (b) said radar sensor device utilizes digital beam steering, and (c) said radar sensor device comprises a phased array antenna.

7. The sensing system of claim 5, wherein said radar sensor device and said image sensor share, at least in part, common circuitry.

8. The sensing system of claim 5, wherein said alert comprises a visual indication comprising at least one of (i) an enhancement of an image displayed on a display screen disposed in the interior cabin of the equipped vehicle and (ii) an overlay on an image displayed on a display screen disposed in the interior cabin of the equipped vehicle.

9. A forward facing sensing system for a vehicle, the vehicle having a windshield, said forward facing sensing system comprising:
- a radar sensor device disposed within an interior cabin of a vehicle equipped with said forward facing sensing system, and wherein said radar sensor device has a sensing direction forward of the equipped vehicle;
- wherein said radar sensor device comprises an array antenna and wherein said radar sensor device utilizes digital beam forming;
- an image sensor disposed within the interior cabin of the equipped vehicle and wherein said image sensor has a viewing direction forward of the equipped vehicle;
- wherein said image sensor comprises a pixelated image array sensor having a two dimensional array of photo-sensing elements;
- wherein said image sensor is at least one of (a) proximate to a windshield of the equipped vehicle and (b) optically coupled at a windshield of the equipped vehicle;
- wherein said radar sensor device and said image sensor are disposed behind the vehicle windshield in a windshield electronics module;
- wherein said image sensor views through the vehicle windshield of the equipped vehicle at a location that is at or near where an interior rearview mirror assembly of the equipped vehicle is located;
- a control comprising an image processor;
- wherein said image processor processes image data captured by said image sensor utilizing object detection software;
- wherein processing by said image processor of image data captured by said image sensor utilizing object detection software comprises processing of pixel outputs within a sub-array of said image sensor;
- wherein said image processor is operable to analyze image data captured by said image sensor in order to, at least in part, detect an object present forward of the equipped vehicle in its direction of forward travel;
- wherein said control, responsive at least in part to processing by said image processor of captured image data and to an output of said radar sensor device, determines that a potentially hazardous condition may exist in the path of forward travel of the equipped vehicle, and wherein said potentially hazardous condition comprises at least one of (i) another vehicle in the path of forward travel of the equipped vehicle, (ii) a person in the path of forward travel of the equipped vehicle and (iii) an animal in the path of forward travel of the equipped vehicle;
- wherein said radar sensor device and said image sensor collaborate in a way that enhances the sensing capability of said sensing system for determining the potentially hazardous condition in the path of forward travel of the equipped vehicle;
- wherein said radar sensor device and said image sensor share, at least in part, common circuitry;
- wherein, responsive to said control determining that a potentially hazardous condition exists in the path of forward travel of the equipped vehicle, said control generates an alert, and wherein said alert comprises at least one of (i) a visual indication and (ii) an audible indication;

wherein said image sensor comprises part of (i) an automatic headlamp control system of the equipped vehicle and (ii) a lane departure warning system of the equipped vehicle; and wherein said control, responsive at least in part to processing by said image processor of captured image data and to an output of said radar sensor device, at least in part controls an adaptive cruise control system of the equipped vehicle.

10. The sensing system of claim 9, wherein at least one of (a) said radar sensor device utilizes at least one of beam aiming and beam selection, (b) said radar sensor device utilizes digital beam steering, and (c) said radar sensor device comprises a phased array antenna.

11. The sensing system of claim 9, wherein said alert comprises a visual indication comprising at least one of (i) an enhancement of an image displayed on a display screen disposed in the interior cabin of the equipped vehicle and (ii) an overlay on an image displayed on a display screen disposed in the interior cabin of the equipped vehicle.

* * * * *